United States Patent
Shimizu et al.

(10) Patent No.: US 9,914,456 B2
(45) Date of Patent: Mar. 13, 2018

(54) CONTROL SYSTEM FOR FOUR-WHEEL DRIVE VEHICLE

(71) Applicant: TOYOTA JIDOSHA KABUSHIKI KAISHA, Toyota-shi, Aichi-ken (JP)

(72) Inventors: Satoshi Shimizu, Toyota (JP); Yoshiro Obayashi, Toyota (JP); Ryota Horie, Nagoya (JP); Norihiro Mizoguchi, Toyota (JP); Shintarou Mukougawa, Toyota (JP); Kunihiro Iwatsuki, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/023,203

(22) PCT Filed: Sep. 12, 2014

(86) PCT No.: PCT/IB2014/001793
§ 371 (c)(1),
(2) Date: Mar. 18, 2016

(87) PCT Pub. No.: WO2015/040463
PCT Pub. Date: Mar. 26, 2015

(65) Prior Publication Data
US 2016/0229405 A1    Aug. 11, 2016

(30) Foreign Application Priority Data
Sep. 19, 2013 (JP) ................. 2013-194654

(51) Int. Cl.
| | | |
|---|---|---|
| *B60K 23/08* | (2006.01) | |
| *B60W 30/18* | (2012.01) | |
| *B60W 30/182* | (2012.01) | |
| *B60K 17/35* | (2006.01) | |
| *B60K 35/00* | (2006.01) | |
| *B60W 10/02* | (2006.01) | |
| *B60W 10/06* | (2006.01) | |
| *B60W 10/10* | (2012.01) | |

(52) U.S. Cl.
CPC ............. *B60W 30/18* (2013.01); *B60K 17/35* (2013.01); *B60K 23/08* (2013.01); *B60K 35/00* (2013.01);
(Continued)

(58) Field of Classification Search
None
See application file for complete search history.

(56) References Cited

U.S. PATENT DOCUMENTS 5,564,519 A * 10/1996 Katoh ................ B60K 23/0808
                                                                180/197
6,151,543 A   11/2000 McKee et al.
(Continued)

FOREIGN PATENT DOCUMENTS

JP     S61-244627 A    10/1986
JP     S63-115833 U     7/1988
(Continued)

OTHER PUBLICATIONS

Apr. 11, 2017 Office Action issued in Japanese Patent Application No. 2013-194654.

*Primary Examiner* — Erin D Bishop
(74) *Attorney, Agent, or Firm* — Oliff PLC

(57) ABSTRACT

A rotation state of each rotating element of a four-wheel drive vehicle and an operating state of each engagement element of a disconnect mechanism, corresponding to an operating state of the disconnect mechanism, are displayed on or near a vehicle model image on a vehicle display. Thus, it is possible to inform a driver of the operating state of the disconnect mechanism at any time. Thus, the driver is able to recognize the operating state of the disconnect mechanism at any time, so the driver is able to carry out driving based on the operating state.

15 Claims, 9 Drawing Sheets

(52) U.S. Cl.
CPC ............ *B60W 10/02* (2013.01); *B60W 10/06* (2013.01); *B60W 10/10* (2013.01); *B60W 30/182* (2013.01); *B60K 17/3515* (2013.01); *B60K 2350/352* (2013.01); *B60W 2710/02* (2013.01); *B60W 2710/06* (2013.01); *B60W 2710/10* (2013.01)

(56) References Cited

U.S. PATENT DOCUMENTS

| | | | |
|---|---|---|---|
| 7,145,442 B1* | 12/2006 | Wai | B60R 16/0231 |
| | | | 340/438 |
| 8,058,982 B2* | 11/2011 | Crowe | B60K 6/48 |
| | | | 340/439 |
| 2005/0212669 A1 | 9/2005 | Ono et al. | |
| 2007/0208468 A1* | 9/2007 | Sankaran | B60K 6/445 |
| | | | 701/31.4 |
| 2010/0094519 A1* | 4/2010 | Quehenberger | B60K 17/35 |
| | | | 701/69 |
| 2010/0262347 A1* | 10/2010 | Murota | B60K 23/04 |
| | | | 701/69 |
| 2012/0310441 A1* | 12/2012 | Fukushiro | B60W 20/1084 |
| | | | 701/1 |
| 2013/0079986 A1 | 3/2013 | Ozawa et al. | |

FOREIGN PATENT DOCUMENTS

| | | |
|---|---|---|
| JP | H04-278832 A | 10/1992 |
| JP | 2005-241626 A | 9/2005 |
| JP | 2010-100280 A | 5/2010 |
| JP | 2010-247586 A | 11/2010 |
| WO | 2012/005255 A1 | 1/2012 |

\* cited by examiner

FIG. 9
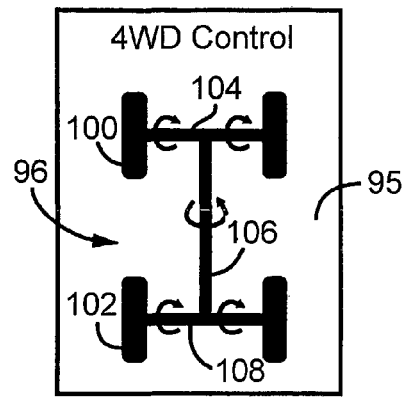
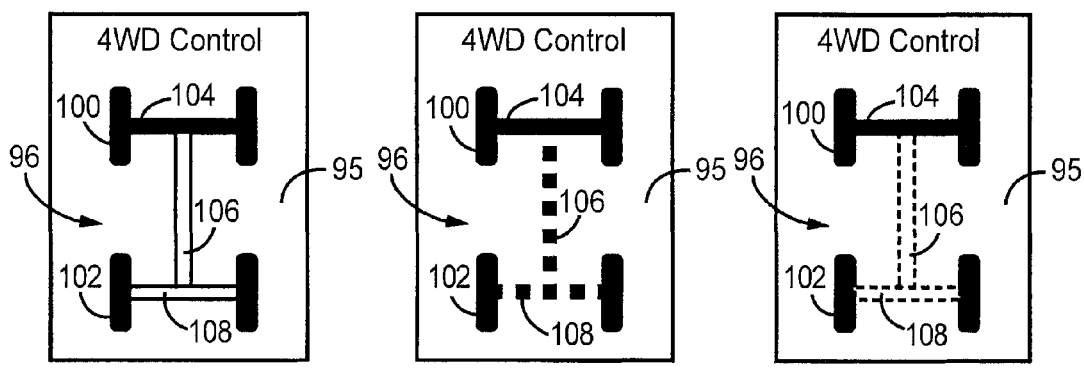
FIG. 10A   FIG. 10B   FIG. 10C
FIG. 11A   FIG. 11B
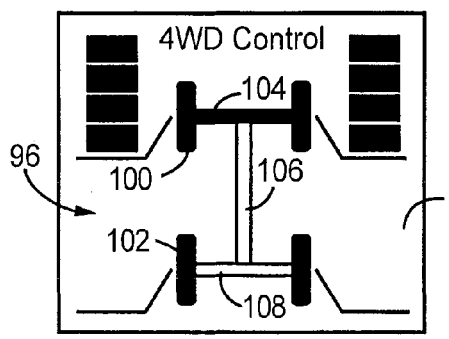
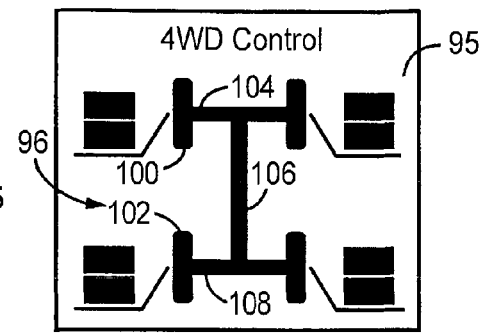

FIG. 17A  FIG. 17B  FIG. 17C
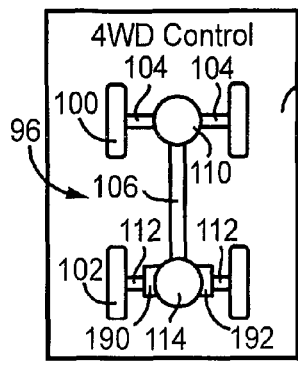 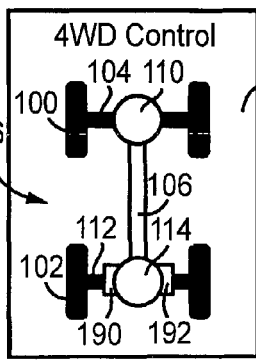 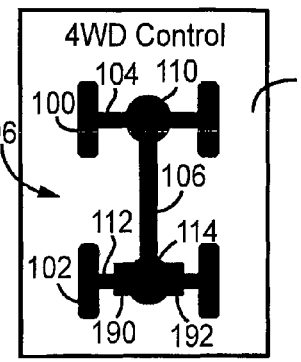
FIG. 18
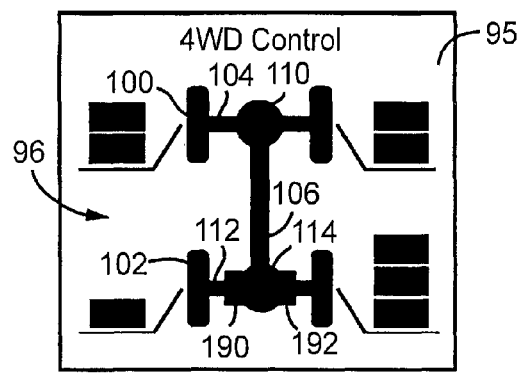
FIG. 19
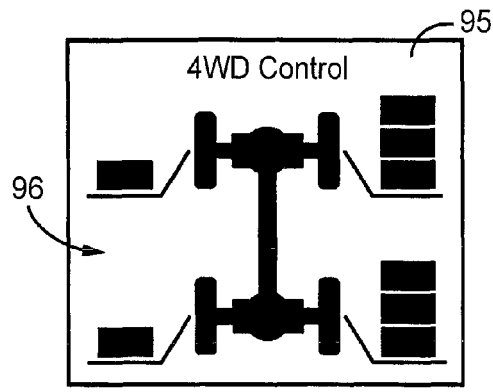

CONTROL SYSTEM FOR FOUR-WHEEL DRIVE VEHICLE

BACKGROUND OF THE INVENTION

1. Field of the Invention

The invention relates to a four-wheel drive vehicle including a disconnect mechanism that is selectively operated to interrupt transmission of power to a predetermined rotating element. More particularly, the invention relates to a device that indicates an operating state of the disconnect mechanism.

2. Description of Related Art

There is known a technique for displaying the distribution of driving force (the distribution of torque), which is transmitted to front and rear drive wheels of a four-wheel drive vehicle, on a vehicle model image of an in-vehicle display provided at an in-vehicle driver seat. This is a torque distribution display device for a four-wheel drive vehicle, described in Japanese Patent Application Publication No. 61-244627 (JP 61-244627 A). In the torque distribution display device described in JP 61-244627 A, the distribution of driving force during traveling is displayed at any time so as to be visually recognized by a driver. For example, the distribution of driving force is displayed at any time by partially changing the colors of the front and rear drive wheels, or providing scales in proximity to the vehicle model image and using the scales in combination with indicators each indicating the amount of torque distributed.

SUMMARY OF THE INVENTION

There is suggested a four-wheel drive vehicle including auxiliary drive wheels and a disconnect mechanism as described in Japanese Patent Application Publication No. 2010-100280 (JP 2010-100280 A). Power is transmitted from an engine to the auxiliary drive wheels while the vehicle travels in a four-wheel drive mode. The disconnect mechanism is provided in a power transmission path between the engine and the auxiliary drive wheels, and stops rotation by interrupting transmission of power to a predetermined rotating element that transmits power to the auxiliary drive wheels in the four-wheel drive mode. In the four-wheel drive vehicle including the disconnect mechanism, when the disconnect mechanism is operated, co-rotation of the predetermined rotating element is prevented. Thus, an agitation resistance, or the like, of lubricating oil by the rotating element is reduced, so fuel economy improves. However, when the vehicle shifts from a two-wheel drive mode to the four-wheel drive mode while the vehicle travels in the two-wheel drive mode in a state where rotation of the rotating element is stopped by the disconnect mechanism (hereinafter, referred to as disconnect mode), there is a possibility that it takes time to shift the drive mode. There is a high possibility that a longer time is required for the vehicle to shift from the disconnect mode to the four-wheel drive mode than the vehicle shifts from a standby two-wheel drive mode (described later) to the four-wheel drive mode while the vehicle travels in a standby two-wheel drive mode. Thus, for example, when the drive mode automatically shifts between the two-wheel drive mode in the disconnect mode and the four-wheel drive mode, it is desirable to inform the driver of the operating state of the disconnect mechanism at any time. However, a display device that is able to clearly inform the driver of the operating state of the disconnect mechanism at any time has not been disclosed at the present time.

The invention provides a control device for a four-wheel drive vehicle. The four-wheel drive vehicle includes auxiliary drive wheels, to which power is transmitted from an engine while the vehicle travels in a four-wheel drive mode; and a disconnect mechanism provided in a power transmission path between the engine and the auxiliary drive wheels, and interrupting transmission of power from the engine and the auxiliary drive wheels to a predetermined rotating element in the four-wheel drive mode. The electronic control unit is able to inform a driver of an operating state of the disconnect mechanism at any time.

A first aspect of the invention provides a control device for four-wheel drive vehicle. The four-wheel drive vehicle includes: an engine; drive wheels to which power is not transmitted from the engine while the vehicle travels in a two-wheel drive mode and power is transmitted from the engine while the vehicle travels in a four-wheel drive mode; a rotating element configured to transmit power from the engine to the drive wheels in the four-wheel drive mode; a disconnect mechanism provided in a power transmission path between the engine and the drive wheels, the disconnect mechanism being configured to interrupt transmission of power from the engine and the drive wheels to the rotating element in the two-wheel drive mode. The control device includes an electronic control unit. The electronic control unit is configured to shift an operating state of the disconnect mechanism based on a vehicle drive mode. The electronic control unit is configured to configured to display the operating state of the disconnect mechanism at one of the following display positions, (i) a display position on a vehicle model image of an in-vehicle display and (ii) a display position near the vehicle model image of the in-vehicle display.

According to the above aspect, the operating state of the disconnect mechanism is displayed at one of the display positions. Thus, it is possible to inform a driver of the operating state of the disconnect mechanism. Thus, the driver is allowed to recognize the operating state of the disconnect mechanism, so the driver is able to carry out driving based on the operating state of the disconnect mechanism.

In the above aspect, the electronic control unit may be configured to display the operating state of the disconnect mechanism by one of text and a mark. According to the above aspect, the operating state of the disconnect mechanism is further clearly displayed by one of text and a mark on the in-vehicle display.

In the above aspect, the vehicle model image may include an image showing the rotating element. The electronic control unit may be configured to display the rotating element in one of the following display modes in a disconnect mode where transmission of power from the engine and the drive wheels to the rotating element is interrupted, (a) the image showing the rotating element is not displayed, (b) the image showing the rotating element is displayed by a lighter color than that of images showing other rotation elements, and (c) the image showing the rotating element in the disconnect mode is displayed by a color different from that of the image showing the rotating element in a mode other than the disconnect mode. According to the above aspect, the rotating element to which transmission of power is interrupted in the disconnect mode is clearly displayed.

In the above aspect, the vehicle model image may include an image showing an engagement element of the disconnect mechanism. The electronic control unit may be configured to display an engaged state or a released state of the engagement element. According to the above aspect, the engaged state or released state of the engagement element is clearly displayed.

In the above aspect, the electronic control unit may be configured to display a disconnect mode where transmission of power from the engine and the drive wheels to the rotating element is interrupted, a non-disconnect mode, and a transitional mode at the time of shifting from one of the disconnect mode and the non-disconnect mode to the other one of the disconnect mode and the non-disconnect mode. According to the above aspect, the rotation state of the rotating element in the transitional mode at the time of shifting from one of the disconnect mode and the non-disconnect mode to the other one of the non-disconnect mode to the disconnect mode is clearly displayed.

In the above aspect, the electronic control unit may be configured to display a rotation state of the rotating element by one of text and a mark. The electronic control unit may be configured to display a state where transmission of power to the rotating element is interrupted from the engine and the drive wheels, by one of the text and the mark in a disconnect mode where transmission of power from the engine and the drive wheels to the rotating element is interrupted. According to the above aspect, the rotating element in a state where transmission of power is interrupted is clearly displayed by text or a mark.

In the above aspect, the electronic control unit may be configured to display a rotation state of the rotating element by the size of an arrow placed at one of a position on the rotating element and a position near the rotating element. The electronic control unit may be configured to display the arrow, corresponding to the rotating element of which rotation is stopped, in substantially zero length in a disconnect mode where transmission of power from the engine and the drive wheels to the rotating element is interrupted. According to the above aspect, the rotation state of the rotating element is clearly displayed by the arrow, and the rotating element in a non-rotated state is also clearly displayed by the arrow having a length of substantially zero.

In the above aspect, the electronic control unit may be configured to change a display of the rotating element, to which transmission of power from the engine and the drive wheels is interrupted, from continuous line to dashed line in a disconnect mode where transmission of power from the engine and the drive wheels to the rotating element is interrupted. According to the above aspect, the rotating element in a rotated state and the rotating element in a power transmission interrupted state are clearly displayed as distinguished from each other. The electronic control unit may be configured to change a display of the rotating element, to which transmission of power from the engine and the drive wheels is interrupted, into one of the following modes when the electronic control unit shifts into a disconnect mode where transmission of power from the engine and the drive wheels to the rotating element is interrupted, (1) the display of the rotating element is changed from a lit state of both a frame of the rotating element and an area of the rotating element, surrounded by the frame, into a lit state of only the frame of the rotating element, and (2), the display of the rotating element is changed from a lit state of both the frame of the rotating element and the area of the rotating element, surrounded by the frame, to a lit state of only the frame of the rotating element in dashed-line form.

In the above aspect, the electronic control unit may be configured to display a driving force of each wheel at one of the display positions. The electronic control unit may be configured to display the driving force of each of the drive wheels as one of zero and substantially zero in a disconnect mode where transmission of power from the engine and the drive wheels to the rotating element is interrupted. According to the above aspect, not only the operating state of the disconnect mechanism but also the driving force of each wheel is clearly displayed, so the driver is allowed to recognize the driving force of each wheel as well.

In the above aspect, a right and left driving force distribution control device may be provided in association with at least one of a pair of front wheels or a pair of rear wheels. The electronic control unit may be configured to display the driving force of each of the right and left wheels and the operating state of the disconnect mechanism together. According to the above aspect, the distribution of driving force between the right and left wheels, distributed by the right and left driving force distribution control device, is clearly displayed, so the driver is allowed to accurately recognize not only the operating state of the disconnect mechanism but also the driving force of each wheel.

In the above aspect, the electronic control unit may be configured to display an abnormality of a system of the four-wheel drive vehicle when the electronic control unit detects the abnormality. According to the above aspect, when an abnormality of the system of the four-wheel drive vehicle is detected, it is possible to quickly inform the driver of the abnormality.

In the above aspect, the electronic control unit may be configured to switch from a screen for displaying the operating state of the disconnect mechanism to a screen for displaying an abnormality of the system of the four-wheel drive vehicle when the electronic control unit detects the abnormality. According to the above aspect, it is possible to quickly inform the driver of the detection of the abnormality. In the above aspect, the electronic control unit may be configured to blink the vehicle model image when the electronic control unit detects the abnormality. In the above aspect, the electronic control unit may be configured to display a fact that the abnormality of the system of the four-wheel drive vehicle is detected, on the vehicle model image when the electronic control unit detects the abnormality.

In the above aspect, the electronic control unit may be configured to display one of fuel economy effect based on operation of the disconnect mechanism and fuel economy effect based on traveling in a mode other than the four-wheel drive mode. According to the above aspect, the driver is allowed to recognize one of fuel economy effect based on the operation of the disconnect mechanism and fuel economy effect obtained through two-wheel drive including the operation of the disconnect mechanism.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 9 is further another one mode of the vehicle model image shown in FIG. 2;

FIG. 10A to FIG. 10C each are further another one mode of the vehicle model image shown in FIG. 2;

FIG. 11A and FIG. 11B each are further another one mode of the vehicle model image shown in FIG. 2;

FIG. 17A to FIG. 17C each are one mode of a vehicle model image corresponding to the four-wheel drive vehicle shown in FIG. 16;

FIG. 18 is another one mode of the vehicle model image corresponding to the four-wheel drive vehicle shown in FIG. 16;

FIG. 19 is one mode of a vehicle model image for a four-wheel drive vehicle in which right and left driving force distribution control devices are respectively provided in association with a pair of front wheels and a pair of rear wheels;

DETAILED DESCRIPTION OF EMBODIMENTS

Hereinafter, embodiments of the invention will be described in detail with reference to the accompanying drawings. In the following embodiments, the drawings are simplified or modified as needed, and the scale ratio, shape, and the like, of each portion are not always accurately drawn.

Figure 1:
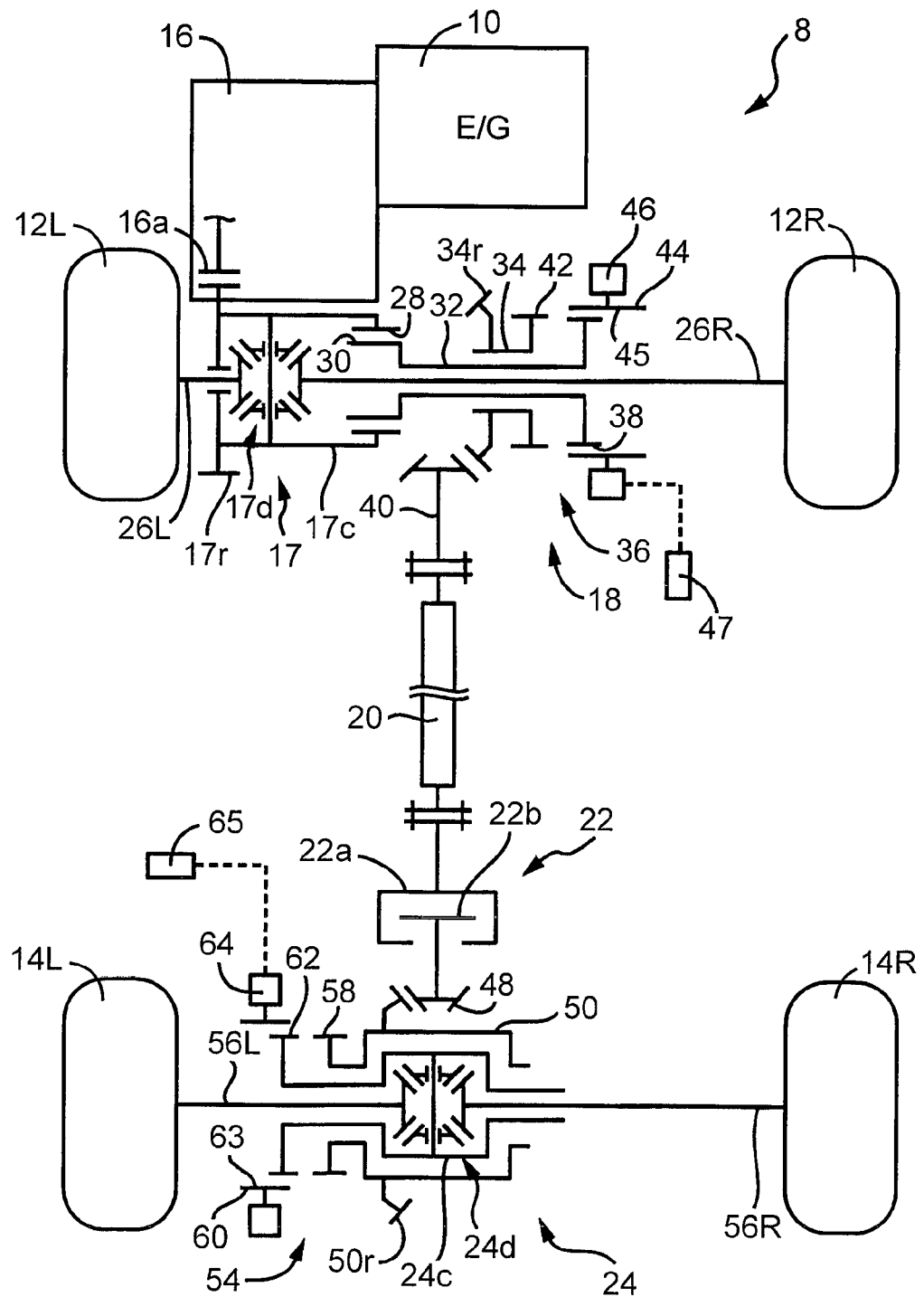
FIG. 1 is a skeletal view that schematically illustrates the configuration of a four-wheel drive vehicle to which the invention is suitably applied.

FIG. 1 is a skeletal view that schematically illustrates the configuration of a four-wheel drive vehicle 8 to which the invention is suitably applied. As shown in FIG. 1, the four-wheel drive vehicle 8 includes a four-wheel drive system based on an FF system. The four-wheel drive vehicle 8 includes an engine 10 as a driving source, and includes a first power transmission path and a second power transmission path. The first power transmission path transmits power of the engine 10 to front wheels 12R, 12L (when not particularly distinguished from each other, referred to as front wheels 12). The second power transmission path transmits power of the engine 10 to rear wheels 14R, 14L (when not particularly distinguished from each other, referred to as rear wheels 14). The four-wheel drive vehicle 8 includes an automatic transmission 16, a front differential 17, a transfer 18, a propeller shaft 20, a coupling 22, a rear differential 24, and the like. Although not shown in FIG. 1, a torque converter that is a fluid transmission device is provided between the engine 10 and the automatic transmission 16.

The automatic transmission 16 is, for example, formed of a stepped automatic transmission. The stepped automatic transmission includes a plurality of planetary gear units and frictional engagement devices (a clutch and a brake). The automatic transmission 16 is configured in accordance with a known technique, so the description of specific structure and operation is omitted.

The front differential 17 (front differential gear) includes a case 17c and a differential mechanism 17d formed of bevel gears. The front differential 17 transmits power while allowing appropriate differential rotation to the right and left axles 26R, 26L of the front wheels 14. A ring gear 17r is formed in the case 17c of the front differential 17. The ring gear 17r is in mesh with an output gear 16a that is an output rotating member of the automatic transmission 16. Thus, power that is output from the automatic transmission 16 is input to the ring gear 17r. Internal teeth 28 are formed on the case 17c of the front differential 17. The internal teeth 28 are fitted to external teeth 30 of a first rotating member 32 (described later). The front differential 17 is configured in accordance with a known technique, so the description of specific structure and operation is omitted.

The transfer 18 is provided side by side with the front differential 17 in a vehicle width direction. The transfer 18 includes the first rotating member 32, a second rotating member 34 and a first clutch 36. The external teeth 30 are formed on the first rotating member 32. A ring gear 34r for transmitting power toward the rear wheels 14 is formed in the second rotating member 34. The first clutch 36 is formed of a dog clutch that selectively connects the first rotating member 32 to the second rotating member 34 or disconnects the first rotating member 32 from the second rotating member 34.

The first rotating member 32 has a cylindrical shape. The axle 26R extends through the radially inner side of the first rotating member 32. The external teeth 30 are formed at one side of the first rotating member 32 in the axial direction. The external teeth 30 are fitted to the internal teeth 28 formed on the case 17c. Thus, the first rotating member 32 rotates integrally with the case 17c of the front differential 17. Clutch teeth 38 that constitute the first clutch 36 are formed at the other side of the first rotating member 32 in the axial direction.

The second rotating member 34 has a cylindrical shape. The axle 26R and the first rotating member 32 extend through the radially inner side of the second rotating member 34. The ring gear 34r that is in mesh with a driven pinion 40 is formed at one side of the second rotating member 34 in the axial direction. Clutch teeth 42 that constitute the first clutch 36 are formed at the other side of the second rotating member 34 in the axial direction. The driven pinion 40 is connected to the propeller shaft 20, and is further connected to a rotating element 22a of the coupling 22 via the propeller shaft 20.

The first clutch 36 is a dog clutch for connecting the first rotating member 32 to the second rotating member 34 or disconnecting the first rotating member 32 from the second rotating member 34. The first clutch 36 is a dog clutch (separating device), and includes the clutch teeth 38, the clutch teeth 42, a sleeve 44 and a shift fork 46. The clutch teeth 38 are formed on the first rotating member 32. The clutch teeth 42 are formed on the second rotating member 34. Internal teeth 45 are formed in the sleeve 44. The internal teeth 45 are able to be in mesh with the clutch teeth 38 and the clutch teeth 42. The shift fork 46 actuates the sleeve 44 in the axial direction. The shift fork 46 is actuated by an electrically controllable first actuator 47. The first clutch 36 may further include a synchronization mechanism.

FIG. 1 shows a state where the first clutch 36 is released. At this time, the first rotating member 32 is disconnected from the second rotating member 34, so no power from the engine is transmitted to the rear wheels 14. On the other hand, when the sleeve 44 is displaced and then the clutch teeth 38 and the clutch teeth 42 both mesh with the internal teeth 45 of the sleeve 44, the first clutch 36 is engaged, and the first rotating member 32 is connected to the second rotating member 34. Thus, when the first rotating member 32 rotates, the second rotating member 34, the driven pinion 40, the propeller shaft 20 and the rotating element 22a of the coupling 22 are co-rotated. The first clutch 36 is one example of an engagement element of a disconnect mechanism according to the invention.

The coupling 22 is provided between the propeller shaft 20 and the rear differential 24. The coupling 22 transmits torque between the rotating element 22a and the other rotating element 22b. The coupling 22 is an electronically controlled coupling formed of, for example, a wet-type multi-disc clutch. By controlling the torque transmitted by the coupling 22, it is possible to continuously change the distribution of torque between the front and rear wheels within the range of 100:0 to 50:50. Specifically, when current is supplied to an electromagnetic solenoid (not shown) that controls the torque transmitted by the coupling 22, the coupling 22 is engaged with an engagement force directly proportional to the value of the current. For example, when no current is supplied to the electromagnetic solenoid, the engagement force of the coupling 22 becomes zero, that is, the transmitted torque becomes zero, so the distribution of torque between the front and rear wheels is set to 100:0. When the current value of the electromagnetic solenoid increases and the coupling 22 is completely engaged, the distribution of torque between the front and rear wheels is set to 50:50. In this way, as the value of current that is supplied to the electromagnetic solenoid increases, the distribution of torque that is transmitted to the rear wheel side increases. By controlling the current value, it is possible to continuously change the distribution of torque between the front and rear wheels. The coupling 22 is also configured in accordance with a known technique, so the description of specific structure and operation is omitted.

The rotating element 22b of the coupling 22 is connected to a drive pinion 48. The drive pinion 48 is in mesh with a ring gear 50r that is formed in a third rotating member 50 (described later).

The third rotating member 50 is formed in a cylindrical shape. The differential mechanism that constitutes the rear differential 24 (described later) is accommodated radially inward of the third rotating member 50. The ring gear 50r that is in mesh with the drive pinion 48 is formed in the third rotating member 50. Clutch teeth 58 that constitute a second clutch 54 (described later) are formed at one end of the third rotating member 50 in the axial direction.

The rear differential 24 includes a case 24c and a differential mechanism 24d formed of bevel gears. Clutch teeth 62 that constitute the second clutch 54 (described later) are formed at one side of the case 24c of the rear differential 24 in the axial direction. The specific structure and operation of the rear differential 24 are configured in accordance with a known technique, so the description thereof is omitted.

The second clutch 54 is a dog clutch (separating device) for connecting the third rotating member 50 to the rear wheels 14 (rear differential 24) or disconnecting the third rotating member 50 from the rear wheels 14 (rear differential 24). The second clutch 54 includes the clutch teeth 58, the clutch teeth 62, a cylindrical sleeve 60 and a shift fork 64. The shift fork 64 actuates the sleeve 60 in the axial direction. The shift fork 64 is actuated by a second actuator 65. Internal teeth 63 that are able to be in mesh with the clutch teeth 58 and the clutch teeth 62 are formed on the inner periphery of the sleeve 60. A meshing state between the clutch teeth 58, 62 and the internal teeth 63 of the sleeve 60 is changed by controlling the position of the sleeve 60 through the second actuator 65. The second clutch 54 may further include a synchronization mechanism.

FIG. 1 shows a state where the second clutch 54 is released. At this time, the third rotating member 50 is disconnected from the rear differential 24. On the other hand, when the clutch teeth 58 and the clutch teeth 62 both mesh with the internal teeth 63 of the sleeve 60, the third rotating member 50 is connected to the rear differential 24. The second clutch 54 is one example of the engagement element of the disconnect mechanism according to the invention.

In the thus configured four-wheel drive vehicle 8, for example, when the first clutch 36 and the second clutch 54 are engaged and the torque transmitted by the coupling 22 is controlled to a value larger than zero, a driving force based on the torque transmitted by the coupling 22 is also transmitted to the rear wheels 14. Thus, power is transmitted to both the front wheels 12 and the rear wheels 14, and a four-wheel drive mode (4WD mode) is established. In this 4WD mode, by controlling the torque transmitted by the coupling 22, the distribution of torque between the front and rear wheels is adjusted as needed.

When the first clutch 36 and the second clutch 54 are released, the first rotating member 32 is disconnected from the second rotating member 34, so no power is transmitted to the rear wheels 14. That is, a two-wheel drive mode (2WD mode) in which only the front wheels 12 are driven is established. Furthermore, because the third rotating member 50 is disconnected from the rear differential 24, transmission of power to the rotating elements that constitute the power transmission path (the second rotating member 34, the driven pinion 40, the propeller shaft 20, the coupling 22, the drive pinion 48 and the third rotating member 50) from the second rotating member 34 to the third rotating member 50 is interrupted (isolated) from the engine 10 and the rear wheels 14 while the vehicle travels. Thus, rotation of these rotating elements stops, and co-rotation of each of the rotating elements is prevented while the vehicle travels. In this way, co-rotation of each of the rotating elements reduces during forward traveling, so running resistance is reduced. Each of the rotating elements (the second rotating member 34, the driven pinion 40, the propeller shaft 20, the coupling 22, the drive pinion 48 and the third rotating member 50) that constitute the power transmission path from the second rotating member 34 to the third rotating member 50 is one example of a predetermined rotating element for transmitting power to auxiliary drive wheels in a four-wheel drive mode according to the invention. The first clutch 36 and the second clutch 54 are one example of the disconnect mechanism that interrupts transmission of power to the predetermined rotating element, which is used to transmit power to the auxiliary drive wheels in the four-wheel drive mode, from the auxiliary drive wheels in a two-wheel drive mode. The drive mode in which the first clutch 36 and the second clutch 54 are released and transmission of power to each of the rotating elements is interrupted (that is, the 2WD mode where co-rotation is prevented) is one example of a disconnect mode where transmission of power from the engine and the auxiliary drive wheels to the rotating element is interrupted according to the invention. Hereinafter, the following two-wheel drive mode is referred to as 2WD_d mode. In this two-wheel drive mode, the first clutch 36 and the second clutch 54 corresponding to the disconnect mechanism according to the invention are released (set to the disconnect mode according to the invention) and the vehicle travels in a state where co-rotation of each rotating element is prevented.

When the first clutch 36 and the second clutch 54 are engaged and the coupling 22 is released, the propeller shaft 20 is disconnected from the drive pinion 48, so no power is transmitted to the rear wheels 14. That is, the 2WD mode where only the front wheels 12 are driven is established. However, the first clutch 36 and the second clutch 54 are engaged, so each of the rotating elements including the propeller shaft 20 co-rotates (so-called standby mode). In this way, although the vehicle travels in the two-wheel drive mode, fuel economy decreases by the amount of co-rotation of the propeller shaft 20, and the like. However, at the time of shifting from the 2WD mode to the 4WD mode, it is just required to engage the coupling 22. Thus, at the time of shifting from the 2WD mode to the 4WD mode, it is possible to quickly shift the drive mode.

Here, suitably, the engagement elements of the disconnect mechanism are respectively provided at the front wheel side and the rear wheel side in the four-wheel drive vehicle, transmission of power of each of the rotating elements placed between these engagement elements is interrupted by releasing both engagement elements, with the result that rotation of each of these rotating elements is stopped. That is, each of the rotating elements placed between these engagement elements is one example of the predetermined rotating element to which transmission of power is interrupted by the disconnect mechanism.

Suitably, the disconnect mode is one example of a state where transmission of power to the predetermined rotating element placed between the engagement elements is interrupted by releasing the engagement elements of the disconnect mechanism.

The four-wheel drive vehicle 8 shifts as needed between the 2WD mode and the 4WD mode by controlling the engaged/released state of each of the first clutch 36 and the second clutch 54 and the torque transmitted by the coupling 22 on the basis of the drive mode of the vehicle.

Figure 2:
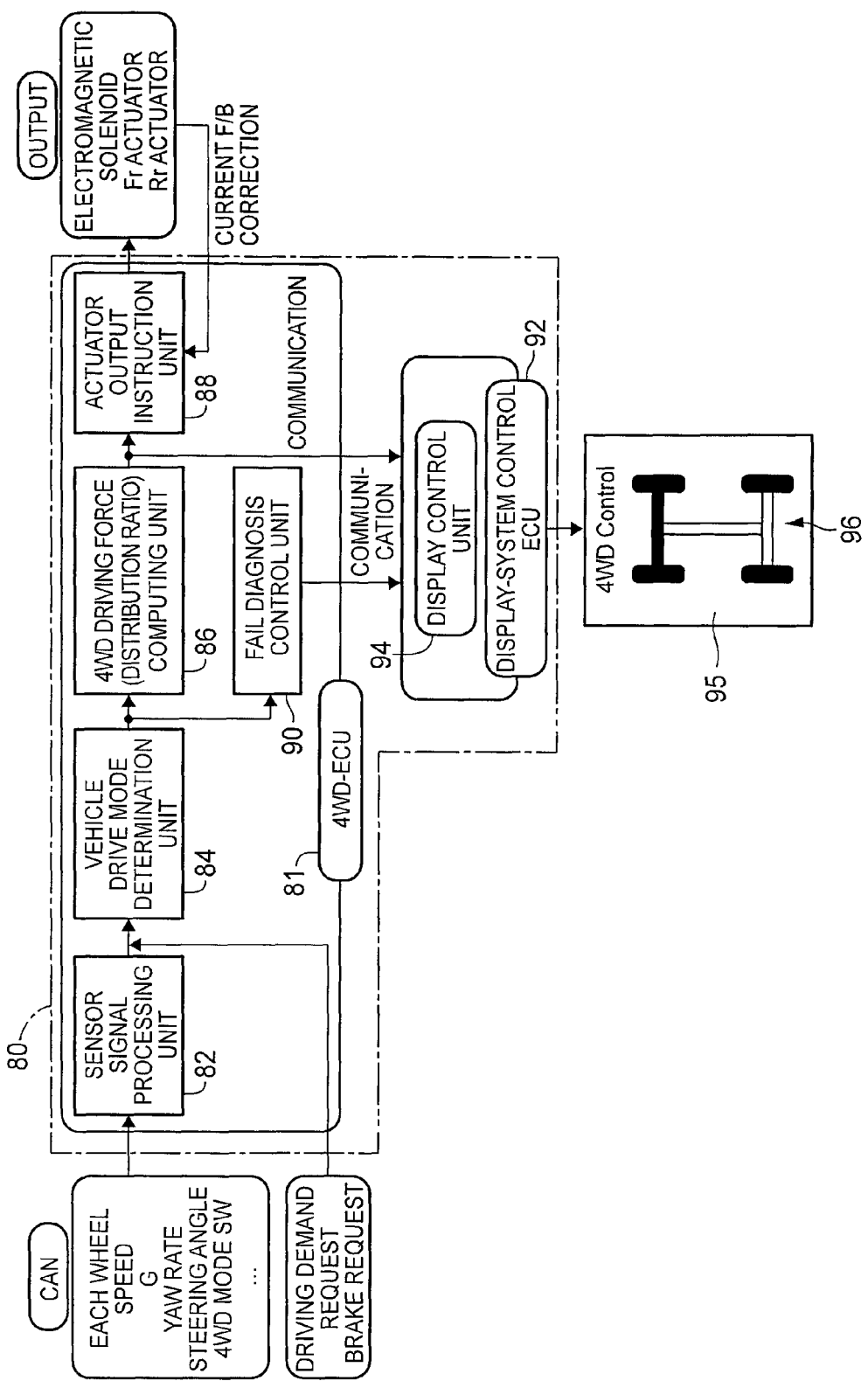
FIG. 2 is a functional block diagram that illustrates control functions of an electronic control unit that controls a driving state of the four-wheel drive vehicle shown in FIG. 1.

FIG. 2 is a functional block diagram that illustrates control functions (control configuration) of an electronic control unit 80 (a 4WD-ECU 81, a display-system control ECU 92, and the like) that controls a driving state of the four-wheel drive vehicle 8. The electronic control unit 80 includes a so-called microcomputer including, for example, a CPU, a RAM, a ROM, input/output interfaces, and the like. The CPU controls the driving state of the four-wheel drive vehicle 8 on the basis of the drive mode of the vehicle by executing signal processing in accordance with a program stored in the ROM in advance while utilizing the temporary storage function of the RAM. Information that is detected by various sensors is supplied to the electronic control unit 80. For example, pieces of information, such as each wheel speed Nr, a vehicle acceleration G, a yaw rate Y (yaw angle), a steering angle θ, and a mode shift signal from a 4WD mode switch, are supplied to the electronic control unit 80. Each wheel speed Nr is detected by a wheel speed sensor that detects the rotation speed of a corresponding one of the wheels. The vehicle acceleration G is detected by an acceleration sensor. The yaw rate Y (yaw angle) is detected by a yaw rate sensor. The steering angle θ is detected by a steering sensor. The 4WD mode switch is provided at a driver seat. A required driving force Tr (driving demand request), a required braking force Br (brake request), or the like, is supplied to the electronic control unit 80 from, for example, an engine ECU (E/G-ECU) that controls the engine 10 (not shown). Although not shown in the drawing, a vehicle speed V that is detected by a vehicle speed sensor, an accelerator operation amount Acc that is detected by an accelerator operation amount sensor, a throttle opening degree θth that is detected by a throttle opening degree sensor, an engine rotation speed Ne that is detected by an engine rotation speed sensor, road gradient information from a navigation system, and the like, are also supplied to the electronic control unit 80.

A sensor signal processing unit 82 processes voltage signals, which are output from the various sensors, as pieces of information based on the various sensors, and outputs the pieces of information to a vehicle drive mode determination unit 84. The vehicle drive mode determination unit 84 determines an optimal driving state of the four-wheel drive vehicle 8 on the basis of various pieces of information, as the current traveling state, processed by the sensor signal processing unit 82. The various pieces of information, processed by the sensor signal processing unit 82, are specifically pieces of information, such as each wheel speed Nr, the vehicle acceleration G, the yaw rate Y, the steering angle θ, the required driving force Tr and the required braking force Br.

When the vehicle drive mode determination unit 84 determines that the vehicle is in a steady traveling state where a change in the driving force of the vehicle is small on the basis of, for example, the accelerator operation amount Acc, the required driving force Tr, the vehicle speed V, and the like, the vehicle drive mode determination unit 84 determines to set the drive mode of the vehicle to the 2WD_d mode in which the vehicle travels in the two-wheel drive mode in a state where the first clutch 36 and the second clutch 54 are released. When the vehicle drive mode determination unit 84 determines that a change in the driving force is larger than that in the steady traveling state, the vehicle drive mode determination unit 84 determines to set the drive mode to the 4WD mode. When the vehicle drive mode determination unit 84 determines that the vehicle is not turning on the basis of, for example, the steering angle θ and the yaw rate Y, the vehicle drive mode determination unit 84 determines to set the drive mode to the 2WD_d mode. When the vehicle drive mode determination unit 84 determines that a road surface is a low-μ road, such as a snow road, on the basis of information from the navigation system, the vehicle drive mode determination unit 84 determines to set the drive mode to the 4WD mode. When the vehicle drive mode determination unit 84 determines that a rotation speed difference between the front and rear wheels exceeds a predetermined value on the basis of each wheel speed Nr, the vehicle drive mode determination unit 84 determines to set the drive mode to the 4WD mode.

A 4WD driving force computing unit 86 calculates an optimal distribution of driving force between the front and rear wheels on the basis of input signals from the various sensors. The 4WD driving force computing unit 86 calculates an engine torque Te from signals, such as the throttle opening degree θth and the engine rotation speed Ne, and calculates the distribution of driving force between the front and rear wheels of the vehicle such that the maximum acceleration performance is ensured. When the 4WD driving force computing unit 86 determines that the operating condition of the driver and a change in the driving force of the vehicle are stable on the basis of, for example, the throttle opening degree θth, the vehicle speed V, each wheel speed Nr, and the like, the 4WD driving force computing unit 86 reduces the distribution of driving force to the rear wheels 14. Thus, fuel economy is improved by placing the vehicle in a condition close to a front-wheel drive mode. The 4WD driving force computing unit 86 reduces the distribution of driving force to the rear wheels 14 in order to prevent a tight corner braking phenomenon, for example, at the time of a turn at a low speed. When the vehicle drive mode determination unit 84 determines to set the drive mode of the vehicle to the 2WD_d mode, the distribution of driving force to the rear wheels 14 becomes zero.

An actuator output instruction unit 88 outputs instruction signals to the first actuator 47 (Fr actuator), the second actuator 65 (Rr actuator) and the electromagnetic solenoid such that the driving state calculated by the vehicle drive mode determination unit 84 and the 4WD driving force computing unit 86 is established. The first actuator 47 changes between the engaged state and released state of the first clutch 36. The second actuator 65 (Rr actuator) changes between the engaged state and released state of the second clutch 54. The electromagnetic solenoid controls the torque transmitted by the coupling 22. When, for example, the vehicle drive mode determination unit 84 determines to set the drive mode to the 2WD_d mode, the actuator output instruction unit 88 releases the first clutch 36 and the second clutch 54, and outputs a command for setting the torque transmitted by the coupling 22 to zero, to the first actuator 47, the second actuator 65 and the electromagnetic solenoid. When the vehicle travels in the 4WD mode at the distribution of driving force, calculated by the 4WD driving force computing unit 86, the actuator output instruction unit 88 engages the first clutch 36 and the second clutch 54, and outputs a command for controlling the torque transmitted by the coupling 22 to the first actuator 47, the second actuator 65 and the electromagnetic solenoid such that the distribution of driving force between the front and rear wheels of the vehicle becomes the calculated value.

A fail diagnosis control unit 90 detects an abnormality of a system for shifting the driving state of the four-wheel drive vehicle 8. The fail diagnosis control unit 90 makes a self-check on a communication state of the electronic control unit 80, or the like, for example, when the power is turned on. In addition, the fail diagnosis control unit 90 determines whether each of the first actuator 47, the second actuator 65 and the electromagnetic solenoid operates normally by passing current to first actuator 47, second actuator 65 and electromagnetic solenoid. When an abnormality has been detected, the fail diagnosis control unit 90 transmits information about the abnormality to the display-system control ECU 92.

The display-system control ECU 92 functionally includes a display control unit 94 that controls a display indicating the driving state of the four-wheel drive vehicle 8 (the operating state of the disconnect mechanism according to the invention) provided on an in-vehicle display 95. The display control unit 94 displays the operating states of the first clutch 36 and second clutch 54 on the basis of the pieces of information from the vehicle drive mode determination unit 84, the 4WD driving force computing unit 86 and the fail diagnosis control unit 90 by using a vehicle model image 96 provided on the in-vehicle display 95. The first clutch 36 and the second clutch 54 are one example of the disconnect mechanism according to the invention. In the vehicle model image 96 shown in FIG. 2, the rotating elements that constitute the power transmission path between the engine 10 and both the front wheels 12 and the rear wheels 14 are shown as a plurality of segments. In the present embodiment, in the 2WD_d mode in which the vehicle travels in a state where the first clutch 36 and the second clutch 54 are released, rotation of each of the rotating elements that constitute the power transmission path, including the propeller shaft 20, between the second rotating member 34 and the third rotating member 50 is stopped. Thus, the vehicle model image 96 is configured to allow the driver to recognize the rotation state of each rotating element at any time. The rotation state of each rotating element is, in other words, the operating state of each of the first clutch 36 and the second clutch 54 that are one example of the disconnect mechanism according to the invention. Hereinafter, a display mode in which the rotation state of each of the rotating elements is displayed by the display control unit 94 will be described. That is, a display mode in which the rotation state of each of the rotating elements (that is, the operating state of the disconnect mechanism) is displayed on the vehicle model image 96 of the in-vehicle display 95 will be described.

Figure 3A:
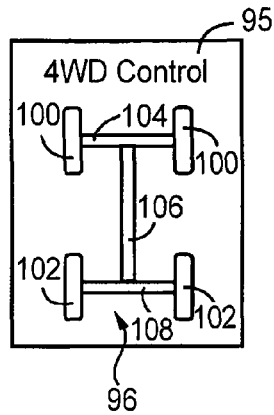
FIG. 3A to FIG. 3C each are one mode of a vehicle model image shown in FIG. 2.
Figure 3B:
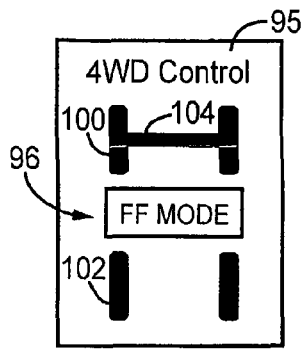
Figure 3C:
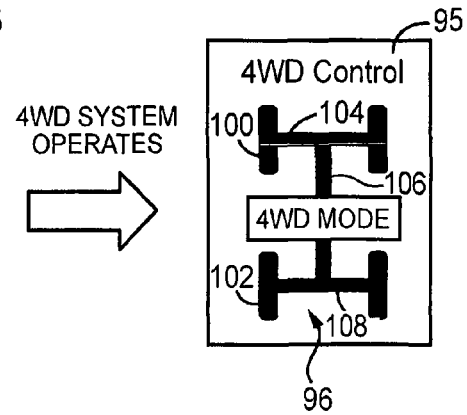

FIG. 3A to FIG. 3C each show one mode of the vehicle model image 96. For example, as shown in FIG. 3A, the vehicle model image 96 is composed of a plurality of segments representing the rotating elements, and displays the operating state of the disconnect mechanism by the lit/unlit states of these segments. In FIG. 3A to FIG. 3C, the segments 100 schematically represent the front wheels 12, the segments 102 schematically represent the rear wheels 14, the segment 104 schematically represents the axles 26 of the front wheels 12, the segment 106 schematically represents a coupling shaft that couples the front wheels to the rear wheels, and the segment 108 schematically represents power transmission elements around the rear wheel axles. The power transmission elements around the rear wheel axles rotate in 4WD mode, and rotation of each of those power transmission elements is stopped by interrupting transmission of power thereto when the vehicle travels in the disconnect mode. Black-filled portions in the in-vehicle display 95 shown in FIG. 3B are in a lit state on the in-vehicle display 95. This indicates that the rotating elements corresponding to the lit segments are in a rotated state. White portions in the in-vehicle display 95 shown in FIG. 3B are in an unlit state. This indicates that the rotating elements corresponding to the unlit segments are in a non-rotated state. FIG. 3B shows a state where the vehicle travels in the 2WD_d mode. The right and left front wheels 100, the axles 104 and the rear wheels 102 are in a lit state. In this way, a state where the front wheels 100 and the axles 104 are in a lit state indicates that the power transmission path from the engine 10 to the front wheels 12 are in a power transmission state or a rotated state. On the other hand, the power transmission element 108 on the axles of the right and left rear wheels 102 and the coupling shaft 106 (see FIG. 3A) are in an unlit state, so the power transmission element 108 and the coupling shaft 106 are not displayed. This indicates a state where rotation of each of the rotating elements that constitute the power transmission path between the first clutch 36 and the second clutch 54 is stopped by releasing the first clutch 36 and the second clutch 54. That is, this indicates a state where rotation of each of the rotating elements that constitute the power transmission path between the first clutch 36 and the second clutch 54 is stopped by interrupting the rotating elements from the front wheel side and the rear wheel side. The rotating elements that constitute the power transmission path between the first clutch 36 and the second clutch 54, for example, include the second rotating member 34, the driven pinion 40, the propeller shaft 20, the drive pinion 48 and the third rotating member 50. In this way, by not lighting (not displaying) the rotating elements of which rotation is stopped by interrupting transmission of power thereto, the driver is easily allowed to recognize the rotating elements in a rotated state and the rotating elements of which rotation is stopped. In addition, in order for the driver to easily understand that the vehicle travels in the 2WD_d mode, the text "FF mode (disconnected two-wheel drive mode)" is displayed between the front wheels 100 and the rear wheels 102. A state where rotation of each of the above-described rotating elements is stopped by interrupting each of the rotating elements from the engine 10 and the rear wheels 14 as a result of releasing the first clutch 36 and the second clutch 54 is one example of a disconnect mode according to the invention.

FIG. 3C shows a state where the drive mode shifts into the 4WD mode (4WD system operates) by engaging the first clutch 36 and the second clutch 54. In FIG. 3C, all the rotating elements, that is, the right and left front wheels 100, the axles 104, the right and left rear wheels 102, the power transmission element 108 on the axles of the right and left rear wheels 102 and the coupling shaft 106 that couples the front and rear wheel sides, are in a lit state. This indicates that the rotating elements that constitute the power transmission path between the engine 10 and the front wheels 12 are in a power transmission state or a rotated state. This also indicates that the rotating elements that constitute the power transmission path between the engine 10 (or the transfer 18) and the rear wheels 14 are in a power transmission state or a rotated state. In this way, by lighting the axles 104, the coupling shaft 106 and the power transmission element 108, the driver is allowed to easily recognize that the four-wheel drive vehicle 8 is in the 4WD mode. In addition, when the text "4WD mode" indicating that the vehicle is in the 4WD mode is displayed at the center of the vehicle model image 96, it becomes further clear that the vehicle is in the 4WD mode.

Figure 4A:
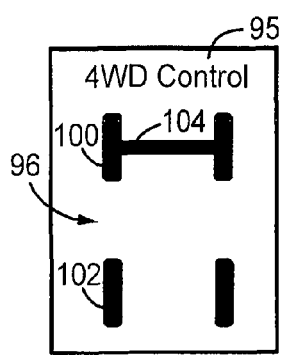
FIG. 4A and FIG. 4B each are another one mode of the vehicle model image shown in FIG. 2.
Figure 4B:
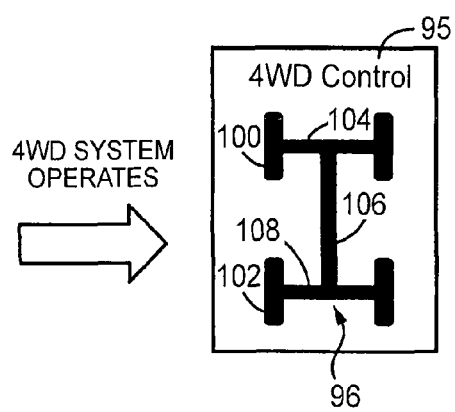

FIG. 4A and FIG. 4B each show another one mode of the vehicle model image 96. In the following description as well, the axles 104 are one example of the rotating elements that constitute the power transmission path from the engine 10 to the front wheels 12. The coupling shaft 106 and the power transmission element 108 are one example of the rotating elements that constitute the power transmission path from the transfer 18 to the rear wheels 14. FIG. 4A shows a state where the vehicle travels in the 2WD_d mode, and is the same as FIG. 3B except that the text ("FF mode") is not displayed. FIG. 4B shows a display state where the vehicle travels in the 4WD mode, and is the same as FIG. 3C except that the text is not displayed.

Figure 5A:
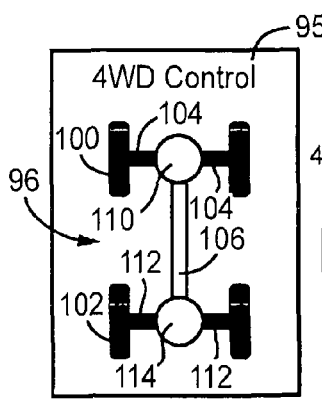
FIG. 5A to FIG. 5C each are further another one mode of the vehicle model image shown in FIG. 2.
Figure 5B:
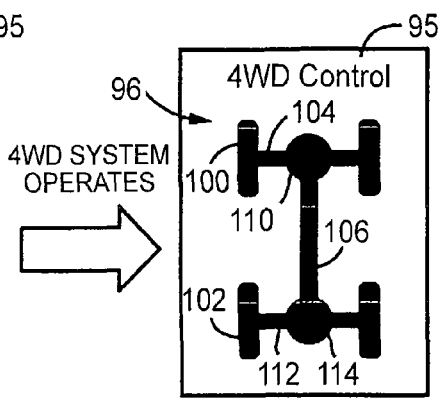
Figure 5C:
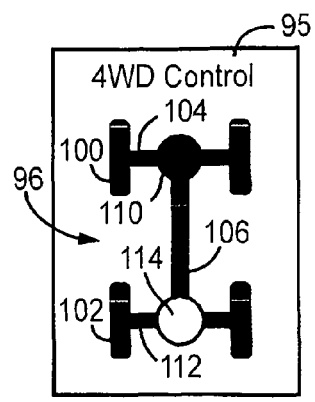

FIG. 5A to FIG. 5C each show further another one mode of the vehicle model image 96. In the vehicle model image 96 shown in FIG. 5A to FIG. 5C, the operating states of the first clutch 36 and the second clutch 54 are further clearly displayed. In FIG. 5A, the circle segment 110 that is displayed between the axles 104 of the right and left front wheels 100 corresponds to the first clutch 36, and the circle segment 114 that is displayed between the axles 112 of the right and left rear wheels 102 corresponds to the second clutch 54. Hereinafter, the circle (110) corresponding to the first clutch 36 is referred to as first clutch 110, and the circle (114) corresponding to the second clutch 54 is referred to as second clutch 114. The segments 112 respectively between the right rear wheel 102 and the second clutch 114 and between the left rear wheel 102 and the second clutch 114 represent the axles 56R, 56L of the rear wheels 14. Here, the first clutch 36 and the second clutch 54 are released (in the disconnect mode), the segments respectively representing the first clutch 110 and the second clutch 114 are displayed by hollow shape (or in an unlit state). Power is transmitted to the front wheels 12, but transmission of power to the rear wheels 14 is interrupted, so the segment representing the coupling shaft 106 is displayed by hollow shape. The axles 56R, 56L of the rear wheels 14 rotate together with the rear wheels 14, so the segments representing the axles 112 are in a lit state. FIG. 5B shows a display state where the vehicle travels in the 4WD mode in a state where the clutches are engaged. The transfer 18 also transmits power to the rear wheels 14, and all the segments are in a lit state. FIG. 5C shows a so-called standby mode where only the first clutch 36 is engaged and the rotating elements are rotating or a transitional mode from the disconnect mode to the 4WD mode or from the 4WD mode to the disconnect mode. At the time of shifting from the disconnect mode to the 4WD mode or from the 4WD mode to the disconnect mode, each of the engagement elements (the first clutch 36 and the second clutch 54) is engaged or released. At the time of shifting from the 4WD mode to the disconnect mode, it takes time until the rotating elements stop because of the inertia of each rotating element. While the vehicle is shifting from the disconnect mode to the 4WD mode or shifting from the 4WD mode to the disconnect mode, the transitional mode illustrated in FIG. 5C is displayed. The transitional mode may be displayed for a predetermined time or may be completed when a stop or rotation of each of the rotating elements has been detected. In the embodiment shown in FIG. 3A to FIG. 3C, a display shown in FIG. 10C (described later) may be employed as the transitional mode. In this way, the engaged or released state of each of the first clutch 36 and the second clutch 54 is clearly displayed by a lit state or hollow shape (or unlit state) of each of the corresponding first clutch 110 and second clutch 114.

Figure 6:
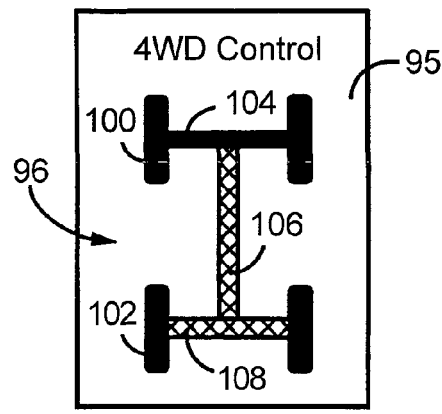
FIG. 6 is further another one mode of the vehicle model image shown in FIG. 2.

FIG. 6 shows further another one mode of the vehicle model image 96. In FIG. 6, in the rotating elements that constitute the power transmission path, the rotating element of which rotation is stopped by interrupting transmission of power in the 2WD_d mode and the rotating element that is in a rotated state are displayed as distinguished from each other. FIG. 6 shows a display while the vehicle travels in the 2WD_d mode. In FIG. 6, the front wheels 100, the rear wheels 102 and the axles 104 are in a lit state. The coupling shaft 106 and the power transmission element 108 to the right and left rear wheels 102 are displayed by a light color (The coupling shaft 106 and the power transmission element 108 to the right and left rear wheels 102 are displayed by a lighter color than images showing the front wheels 100, the rear wheels 102 and the axles 104). Alternatively, the coupling shaft 106 and the power transmission element 108 to the right and left rear wheels 102 are respectively displayed by different colors (in FIG. 6, displayed by hatching for the sake of convenience). That is, the rotating elements that rotate in the 2WD_d mode are in a lit state, and the rotating elements of which rotation is stopped by interrupting transmission of power are displayed by a light color or a different color. In this way, the rotating elements that are set in a non-rotated state in the 2WD_d mode are displayed by a light color or a different color. Thus, the driver is able to easily recognize the rotating elements in a rotated state and the rotating elements of which rotation is stopped.

Figure 7:
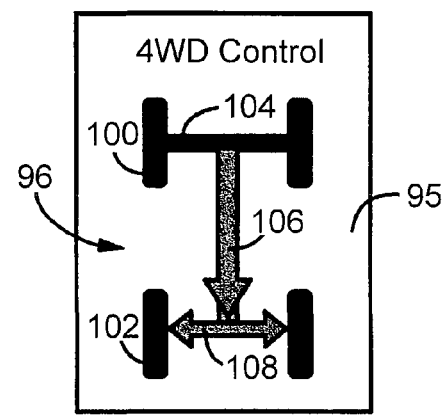
FIG. 7 is further another one mode of the vehicle model image shown in FIG. 2.
Figure 8A:
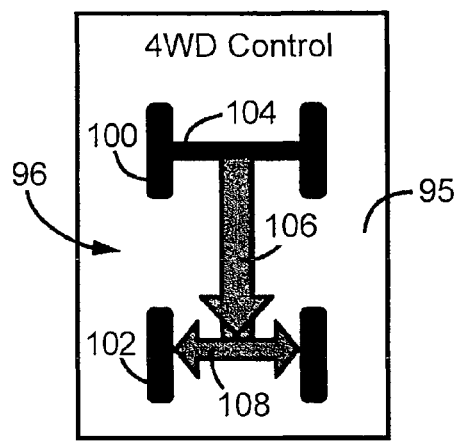
FIG. 8A and FIG. 8B each are further another one mode of the vehicle model image shown in FIG. 2.
Figure 8B:
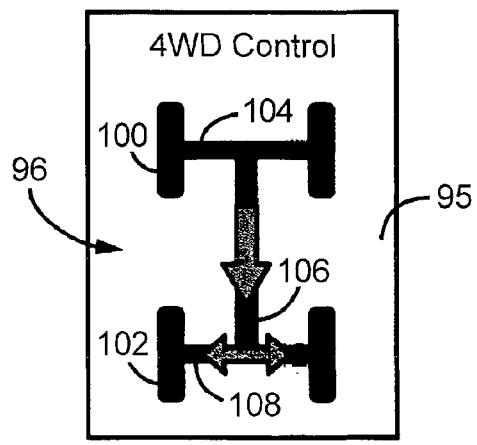

FIG. 7 shows further another one mode of the vehicle model image 96. In the vehicle model image 96 shown in FIG. 7, the arrows (marks) are displayed on the coupling shaft 106 and on the power transmission element 108 around the rear wheel axles. Here, FIG. 7 shows one example of the vehicle model image 96 while the vehicle travels in the 4WD mode. At this time, the arrow oriented from the front wheel side toward the rear wheel side is displayed on the coupling shaft 106. This arrow indicates a direction in which rotation is transmitted. That is, this indicates that the coupling shaft 106 is rotating. The arrows oriented toward the right and left rear wheels 102 are displayed on the power transmission path toward the right and left rear wheels. That is, this indicates that power is transmitted toward the right and left rear wheels 14, and the power transmission element 108 around the rear wheel axles is rotating. On the other hand, although not shown in the drawing, the arrows are set in an unlit state in the disconnect drive mode. Here, the rotation speed of each of these rotating elements may be expressed by the width of the arrow or the length of the arrow. For example, in proportion to the rotation speed of each rotating element, the width of a corresponding one of the arrows is increased as shown in FIG. 8A. Alternatively, in proportion to the rotation speed of each rotating element, the length of each of the arrows is changed as shown in FIG. 8B. Although not shown in the drawing, the light and dark or, color of each of the arrows may be changed on the basis of the rotation speed of a corresponding one of the rotating elements. In the 2WD_d mode, no rotation is transmitted from the transfer 18, so the length of each arrow is substantially zero or each arrow is not displayed. In FIG. 7, FIG. 8A, and FIG. 8B, the rotated state at the front wheels 12 side is omitted. In FIG. 7, FIG. 8A, and FIG. 8B, the rotated state may also be displayed at the front wheels 12 side by using an arrow, and the arrow may be displayed not on the rotating element but near the rotating element.

FIG. 9 shows further another one mode of the vehicle model image 96. In the vehicle model image 96 shown in FIG. 9, the rotation state of each of the rotating elements that constitute the power transmission path is displayed by the arrow that is shown around the corresponding rotating element. The presence of the arrow shown in FIG. 9 indicates that the rotating element corresponding to that arrow is rotating. Specifically, segments of arrow portions are added to FIG. 3A, and the segments of the arrow portions are set in a lit state during rotation. In the arrows shown in FIG. 9 as well, the width or length of each arrow may be changed as needed on the basis of the rotation speed of the corresponding rotating element. In the 2WD_d mode, the coupling shaft 106 and the power transmission element 108 around the rear wheel axles do not rotate, and no arrow is displayed on the coupling shaft 106 or the power transmission element 108.

FIG. 10A to FIG. 10C each show further another one mode of the vehicle model image 96. In the vehicle model image 96 shown in FIG. 10A, in a state where the rotating element is not rotating, only the frame of the rotating element is displayed in a lit state (FIG. 10A). Alternatively, in the vehicle model image 96 shown in FIG. 10B, in a state where the rotating element is not rotating, the rotating element is displayed in a lit state in dashed-line form (FIG. 10B). Alternatively, in the vehicle model image 96 shown in FIG. 10C, in a state where the rotating element is not rotating, only the frame of the rotating element is displayed in a lit state in dashed-line form (FIG. 10C). In this way, the display control unit 94 sets the rotating element in a rotated state to a lit state (both the frame of the rotating element and the area surrounded by the frame of the rotating element are displayed in a lit state). The display control unit 94 displays the rotating element in a non-rotated state in a state where only the frame of the rotating element is in a lit state. Alternatively, the display control unit 94 displays the rotating element in a non-rotated state by the dashed line. Alternatively, the display control unit 94 displays the rotating element in a non-rotated state in a state where only the frame of the rotating element is in a lit state in dashed-line form. Thus, the rotation state of each rotating element is clearly displayed.

FIG. 11A and FIG. 11B each show further another mode of the vehicle model image 96. In FIG. 11A and FIG. 11B, in addition to the rotation state of each rotating element shown in FIG. 3A to FIG. 10C, the driving force (distribution ratio) of each wheel is allowed to be displayed. As shown in FIG. 11A and FIG. 11B, the driving force of each wheel is displayed next to the corresponding wheel by segments. FIG. 11A shows the vehicle model image 96 in the 2WD_d mode. In the 2WD_d mode, driving force is transmitted only to the front wheels 12, so the driving force segments respectively arranged next to the right and left front wheels 100 are set in a lit state. On the other hand, because the driving force of each of the rear wheels 14 is zero, the corresponding driving force segments are not set to a lit state. FIG. 11B shows the vehicle model image 96 while the vehicle travels in the 4WD mode. In the 4WD mode, power is also transmitted to the rear wheels 14, so the driving force segments respectively arranged next to the right and left rear wheels 102 are also set to a lit state. When the distribution of driving force between the front and rear wheels is equal (50:50), the number of the driving force segments of each wheel is equally displayed as shown in FIG. 11B.

Figure 12:
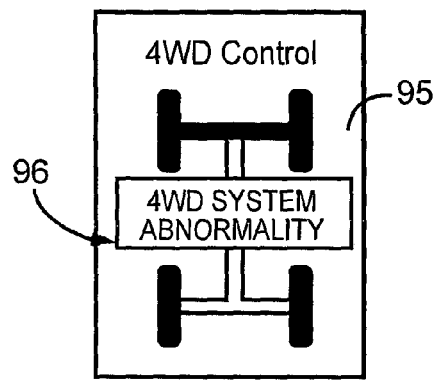
FIG. 12 is further another one mode of the vehicle model image shown in FIG. 2.
Figure 13:
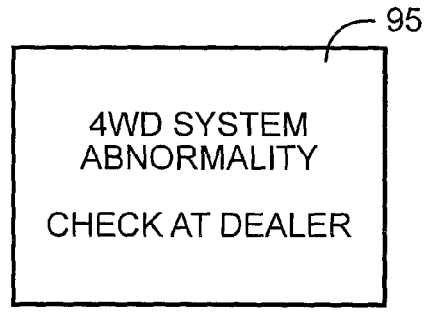
FIG. 13 is an example of a display informing an abnormality on the vehicle model image shown in FIG. 2.

FIG. 12 shows further another one mode of the vehicle model image 96. FIG. 12 shows a display in the case where an abnormality has been detected by the above-described fail diagnosis control unit 90 in the system for shifting the driving state, including the first clutch 36 and the second clutch 54. For example, as shown in FIG. 12, the text (for example, "4WD system abnormality") informing the fact that an abnormality has been detected is displayed on the vehicle model image 96. Alternatively, the entire vehicle model image 96 is blinked. As further another one mode, the in-vehicle display 95 is configured to be able to display a plurality of display screens including the vehicle model image 96. In this case, when an abnormality has been detected in the system, the display control unit 94 preferentially switches from the vehicle model image 96 to text display that informs the abnormality as shown in FIG. 13, and does not allow the vehicle model image 96 to be displayed (the screen that displays the operating state of the disconnect mechanism according to the invention) by prohibiting a change into the vehicle model image 96.

Figure 14A:
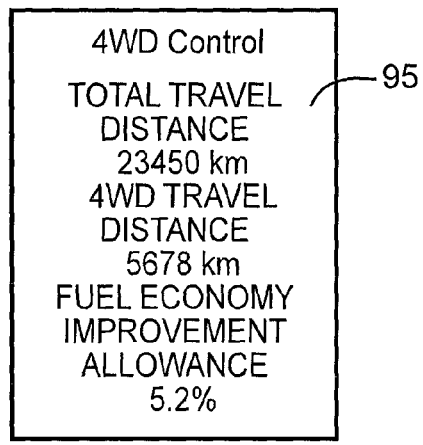
FIG. 14A and FIG. 14B are examples of a display of fuel economy effect on the vehicle model image shown in FIG. 2.
Figure 14B:
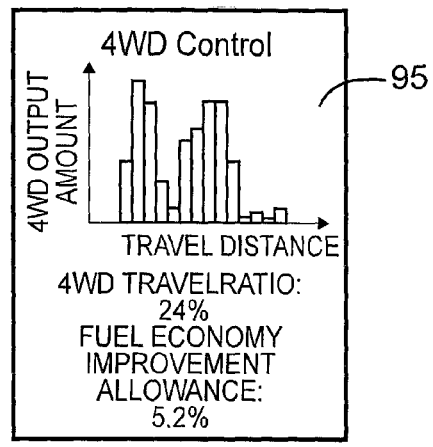

The in-vehicle display 95 is configured to be able to change into a plurality of display screens including the vehicle model image 96. The in-vehicle display 95 is also configured to be able to change into a display screen that indicates fuel economy effect by appropriately shifting from the 4WD mode to the 2WD_d mode. When the in-vehicle display 95 is changed by the driver to the display screen that indicates the fuel economy effect, the display control unit 94, for example, changes the in-vehicle display 95 to the display screen as shown in FIG. 14A. In the display screen shown in FIG. 14A, a total travel distance, a travel distance in the 4WD mode within the total travel distance, and a fuel economy improvement allowance (fuel economy effect) compared with the case where the vehicle constantly travels in the 4WD mode are displayed. A travel time may be used instead of the travel distance. These pieces of information may be displayed together on the same screen as the vehicle model image. Alternatively, as in the case of the display screen shown in FIG. 14B, a graph may be displayed where the abscissa axis represents travel distance and the ordinate axis represents 4WD output amount (=rear wheel driving torque). As in the case of the display screen shown in FIG. 14B, together with the display that allows the driver to check the 4WD output amount during traveling at any time, the percentage of the 4WD mode (4WD mode ratio) during traveling and a fuel economy improvement allowance (fuel economy effect) may be displayed.

Figure 15:
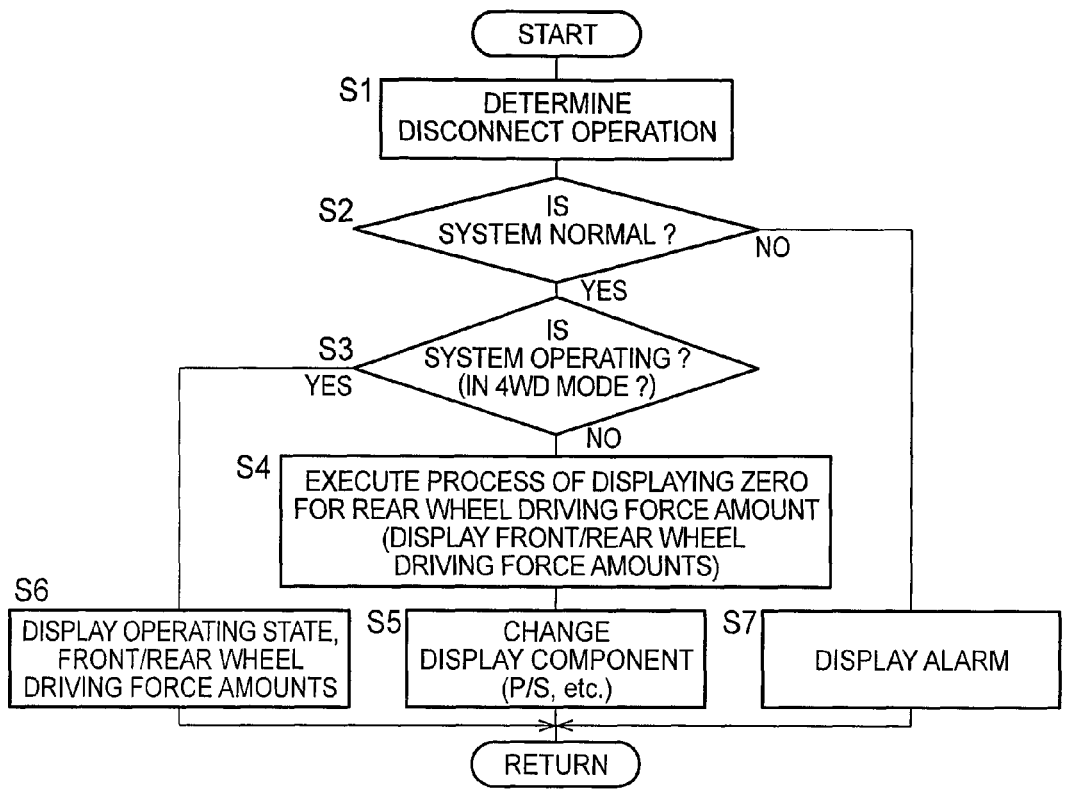
FIG. 15 is a flowchart that illustrates a relevant portion of control operations of the electronic control unit shown in FIG. 2, specifically, control operations for displaying an operating state of the four-wheel drive vehicle on the vehicle model image.

FIG. 15 is a flowchart that illustrates a relevant portion of control operations of the electronic control unit 80 according to the invention, specifically, control operations for displaying the operating state of the four-wheel drive vehicle 8 on the vehicle model image 96.

Initially, in step S1 corresponding to the sensor signal processing unit 82 and the vehicle drive mode determination unit 84, an optimal driving state of the four-wheel drive vehicle 8, that is, the operating states of the first clutch 36, the second clutch 54 and the coupling 22, are determined on the basis of the pieces of information that are detected by the various sensors. Subsequently, in S2 corresponding to the fail diagnosis control unit 90, it is determined whether the system of the four-wheel drive vehicle 8 normally operates. When negative determination is made in S2, the in-vehicle display 95 is changed to the display screen that informs an abnormality as shown in FIG. 12 or FIG. 13 in S7 corresponding to the display control unit 94.

On the other hand, when affirmative determination is made in S2, it is determined in S3 corresponding to the vehicle drive mode determination unit 84 whether the operating state of the four-wheel drive vehicle 8, determined in S1, is the 4WD mode (system operates). When affirmative determination is made in S3, the in-vehicle display 95 is changed to a display screen, for example, as shown in FIG. 3C, FIG. 4B, FIG. 5A, FIG. 7, FIG. 8A, FIG. 8B, FIG. 9, or FIG. 11B in S6 corresponding to the display control unit 94. The rotation state of each of the rotating elements and the distribution of driving force in the 4WD mode are displayed on the vehicle model image 96 or near the vehicle model image 96. When negative determination is made in S3, the driving force that is transmitted to the rear wheels 14 becomes zero in S4 corresponding to the display control unit 94, so the amount of driving force at the rear wheels 14 is displayed as zero, for example, as shown in FIG. 11A. Subsequently, in S5 corresponding to the display control unit 94, the rotating elements that transmit power toward the rear wheels 14, including the propeller shaft 20, are displayed distinctly in an unlit state, in a blinked state, by a light color, by a different color, or the like, as shown in FIG. 3A, FIG. 4A, FIG. 6, FIG. 10A, or FIG. 10C.

As described above, according to the present embodiment, the rotation state of each of the rotating elements of the four-wheel drive vehicle 8 or the operating state of each of the engagement elements of the disconnect mechanism are configured to be displayed at one of the following display positions, (i) a display position on the vehicle model image of the in-vehicle display, and (ii) a display position near the vehicle model image of the in-vehicle display. Thus, it is possible to inform the driver of the operating state of the disconnect mechanism at any time. Thus, the driver is allowed to drive the vehicle on the basis of the operating state of the disconnect mechanism.

According to the present embodiment, the rotation state of each rotating element is further clearly displayed by text or an arrow (a mark, or the like) on the vehicle model image 96.

According to the present embodiment, the electronic control unit may be configured to indicate each rotating element in one of the following display modes in the disconnect mode in which transmission of power from the engine and the drive wheels to the rotating elements is interrupted, (a) an image showing the rotating element is not displayed, (b) an image showing the rotating element is displayed by a lighter color than images showing other rotation elements, and (c) an image showing the rotating element in the disconnect mode is displayed by a color different from that of an image showing the rotating element in a mode other than the disconnect mode. Thus, the rotating elements of which rotation is stopped by interrupting transmission of power are clear.

According to the present embodiment, the vehicle model image 96 may include images showing the engagement elements of the disconnect mechanism, and display the engaged or released state of each of the engagement elements. Thus, the engaged or released state of each of the engagement elements is clear.

According to the present embodiment, the rotation state of each of the rotating elements in the transitional mode in which the drive mode is shifting from the disconnect mode to a non-disconnect mode or from the non-disconnect mode to the disconnect mode is clearly displayed.

According to the present embodiment, the electronic control unit displays that the rotating element is in a non-rotated state by using one of text and a mark on the corresponding rotating element of which rotation is stopped by interrupting transmission of power during traveling. Thus, the rotating element of which rotation is stopped by interrupting transmission of power is clear.

According to the present embodiment, by displaying an arrow indicating the rotation state of each rotating element at one of a position on the corresponding rotating element and a position near the corresponding rotating element, the rotation state of each rotating element is clear. By setting the length of the arrow to substantially zero or not displaying the arrow for the non-rotated rotating element, the non-rotated rotating element is clear.

According to the present embodiment, when the electronic control unit shifts into the disconnect mode where transmission of power from the engine and the drive wheels to the rotating elements is interrupted, the electronic control unit is configured to change a display of each of the rotating elements, to which transmission of power from the engine and the drive wheels is interrupted, into one of the following modes, (1) the display of each rotating element is changed from a lit state of both the frame of the rotating element and the area of the rotating element, surrounded by the frame, into a lit state of only the frame of the rotating element, (2) the display of each rotating element is changed from a lit state of both the frame of the rotating element and the area of the rotating element, surrounded by the frame, into a lit state of only the frame of the rotating element in dashed-line form, and (3) the display of the rotating element, to which transmission of power from the engine and the drive wheels is interrupted, from continuous line to dashed line in a disconnect mode where transmission of power from the engine and the drive wheels to the rotating element is interrupted. Thus, the rotating element in a rotated state and the rotating element of which rotation is stopped are displayed as clearly distinguished from each other.

According to the present embodiment, the driving force of each wheel is also displayed. Thus, it is possible to recognize the rotation state of each rotating element and the driving force of each wheel at the same time.

According to the present embodiment, when an abnormality of the system of the four-wheel drive vehicle 8 has been detected, the abnormality is displayed. Thus, it is possible to quickly inform the driver of occurrence of the abnormality. When an abnormality has been detected, the screen for displaying the rotation state of each rotating element (vehicle model image 96) is not displayed or changed to the screen for displaying the abnormality, so it is possible to quickly inform the driver of the detection of the abnormality.

According to the present embodiment, the fuel economy effect in the 2WD_d mode is displayed, so the driver is allowed to recognize the fuel economy effect in the 2WD_d mode at any time.

Next, other embodiments of the invention will be described. In the following description, like reference numerals denote portions common to the above-described embodiment, and the description thereof is omitted.

Figure 16:
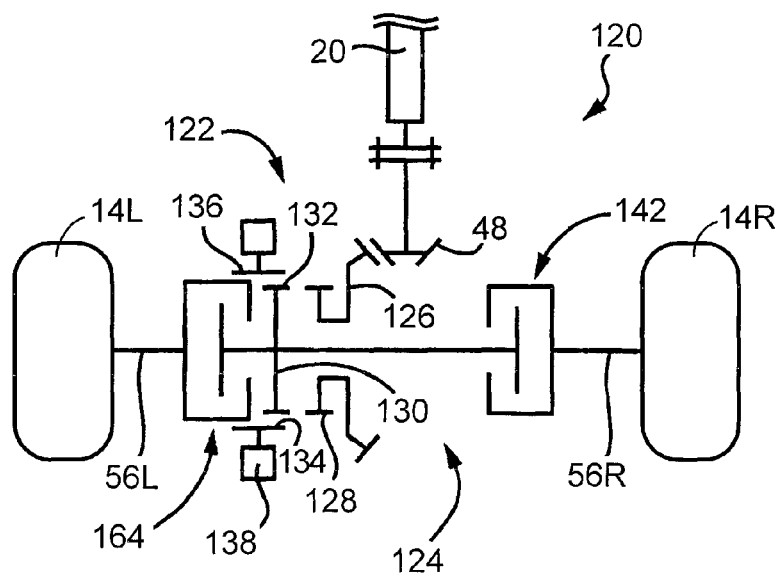
FIG. 16 is a skeletal view that illustrates the structure of a four-wheel drive vehicle according to another embodiment of the invention.

FIG. 16 is a skeletal view that illustrates the structure of a four-wheel drive vehicle 120 according to another embodiment of the invention. The front wheel side of the four-wheel drive vehicle 120 is the same as that of the four-wheel drive vehicle 8 shown in FIG. 1, so FIG. 16 shows only the rear wheel side different from that of the above-described four-wheel drive vehicle 8. As shown in FIG. 16, a second clutch 122 and a right and left driving force distribution control device 124 are provided between the drive pinion 48 and the rear wheels 14. The right and left driving force distribution control device 124 changes the distribution of driving force between the right and left rear wheels 14.

The second clutch 122 is provided between the drive pinion 48 and the right and left driving force distribution control device 124, and connects or interrupts the power transmission path therebetween. The second clutch 122 includes clutch teeth 128, clutch teeth 132, a cylindrical sleeve 136 and a shift fork 138. The clutch teeth 128 are formed on a power transmission member 126 in which a ring gear that is in mesh with the drive pinion 48 is formed. The clutch teeth 132 are formed on the outer periphery of an input gear 130 provided in the right and left driving force distribution control device 124. Internal teeth 134 that are able to mesh with the clutch teeth 128, 132 are formed on the inner periphery of the cylindrical sleeve 136. The shift fork 138 displaces the sleeve 136 in the rotation axis direction. The shift fork 138 is actuated by an actuator (not shown).

When the internal teeth 134 of the sleeve 136 mesh with the clutch teeth 128 and the clutch teeth 132, the power transmission member 126 is connected to the input gear 130, and power is transmitted from the drive pinion 48 to the right and left driving force distribution control device 124. On the other hand, in a state where the internal teeth 134 of the sleeve 136 are not in mesh with the clutch teeth 128 or the clutch teeth 132, the power transmission member 126 is interrupted from the input gear 130, and the power transmission path between the drive pinion 48 and the right and left driving force distribution control device 124 is interrupted.

The right and left driving force distribution control device 124 includes a first coupling 140 and a second coupling 142. The first coupling 140 is provided at the rear wheel 14L side.

The second coupling 142 is provided at the rear wheel 14R side. The first coupling 140 is provided between the input gear 130 and the rear wheel 14L, and is formed of an electronically controlled coupling formed of, for example, a wet-type multi-disc clutch. The driving force that is transmitted to the rear wheel 14L is controlled by controlling the torque transmitted by the first coupling 140. Specifically, as the torque transmitted by the first coupling 140 increases, the driving force that is transmitted to the rear wheel 14L increases. The second coupling 142 is provided between the input gear 130 and the rear wheel 14R, and is formed of an electronically controlled coupling formed of, for example, a wet-type multi-disc clutch. The driving force that is transmitted to the rear wheel 14R is controlled by controlling the torque transmitted by the second coupling 142. Specifically, as the torque transmitted by the second coupling 142 increases, the driving force that is transmitted to the rear wheel 14R increases. By controlling the torque transmitted by the first coupling 140 and the torque transmitted by the second coupling 142, it is possible to continuously control the distribution of torque between the right and left rear wheels 14 between 0:100 and 100:0.

In the four-wheel drive vehicle 120 including the thus configured right and left driving force distribution control device 124 that is able to change the distribution of driving force between the right and left rear wheels 14, the state of the distribution of driving force between the right and left rear wheels 14 is displayed. FIG. 17A shows a vehicle model image in which a segment 190 corresponding to the first coupling 140 and a segment 192 corresponding to the second coupling 142 are added to FIG. 5A to FIG. 5C. FIG. 17B shows an example of a display of the disconnect drive mode. FIG. 17C shows an example of a display of the 4WD mode. FIG. 18 corresponds to FIG. 11B, and, in this case, segments arranged next to the rear wheels 102 are displayed in different levels on the basis of the distribution of driving force between the right and left rear wheels.

Here, the right and left driving force distribution control device 124 may also be provided at the front wheel side or may also be provided at each of the front wheel side and the rear wheel side. Thus, for example, it is possible to change the right and left distribution of driving force at both the front wheel side and the rear wheel side. In such a case, as shown in FIG. 19, right and left segments indicating the distribution of driving force are displayed in different levels at each of the front wheel side and the rear wheel side.

As described above, according to the present embodiment, in addition to similar advantageous effects to those of the above-described embodiment, the distribution of driving force between the right and left rear wheels 14 and the rotation state of each rotating element are displayed together in the vehicle including the right and left driving force distribution control device 124. Therefore, the driver is allowed to accurately recognize not only the operating state of the disconnect mechanism but also the driving force of each wheel.

Figure 20:
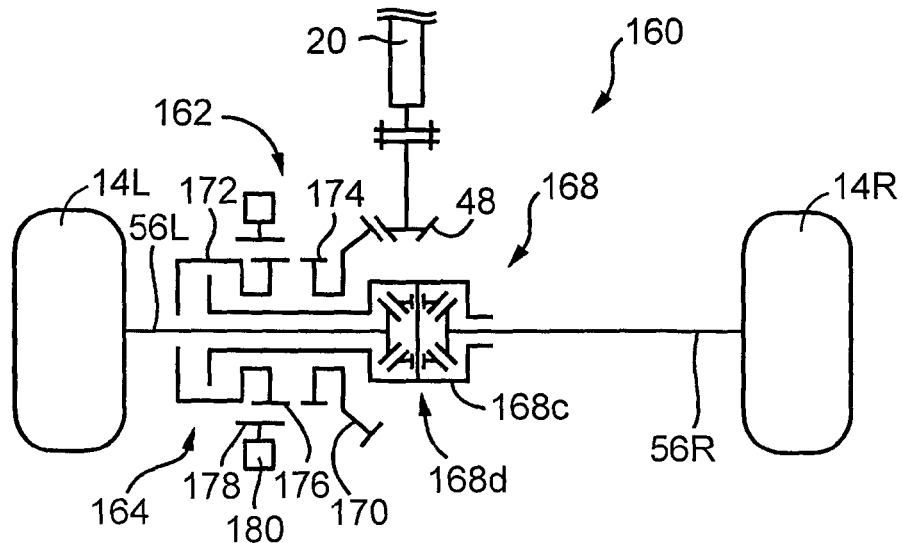
FIG. 20 is a skeletal view of a four-wheel drive vehicle according to further another embodiment of the invention.

FIG. 20 is a skeletal view of a four-wheel drive vehicle 160 according to further another embodiment of the invention. The front wheel side of the four-wheel drive vehicle 160 is the same as that of the above-described four-wheel drive vehicle 8, so FIG. 20 shows only the rear wheel side different from that of the above-described four-wheel drive vehicle 8. As shown in FIG. 20, a second clutch 162, a coupling 164 and a rear differential 168 are provided between the drive pinion 48 and the rear wheels 14.

The second clutch 162 is provided between a power transmission member 172 and a ring gear member 170 in which a ring gear that meshes with the drive pinion 48 is formed, and selectively connects or interrupts the power transmission path therebetween. External teeth that mesh with the drive pinion 48 are formed on the ring gear member 170, and clutch teeth 174 that constitute the second clutch 162 are also formed on the ring gear member 170. Clutch teeth 176 that constitute the second clutch 162 are formed at one end of the power transmission member 172 in the axial direction.

The second clutch 162 is a dog clutch, and includes the clutch teeth 174, the clutch teeth 176, a sleeve 178 and a shift fork 180. The clutch teeth 174 are formed on the ring gear member 170. The clutch teeth 176 are formed on the power transmission member 172. Internal teeth that are able to mesh with the clutch teeth 174 and the clutch teeth 176 are formed on the sleeve 178. The shift fork 180 actuates the sleeve 178 in the axial direction. The shift fork 180 is actuated by an actuator (not shown). A synchronization mechanism may be provided in the second clutch 162.

In the second clutch 162, when the internal teeth of the sleeve 178 mesh with the clutch teeth 174 and the clutch teeth 176 at the same time, the ring gear member 170 is connected to the power transmission member 172. On the other hand, when the internal teeth of the sleeve 178 are not in mesh with at least one of the clutch teeth 174 or the clutch teeth 176, the ring gear member 170 is interrupted from the power transmission member 172.

The coupling 164 is provided between the power transmission member 172 and the rear differential 168. The coupling 164 is an electronically controlled coupling formed of, for example, a wet-type multi-disc clutch, and is able to control the torque transmitted by the coupling 164. In this way, in the present embodiment, the coupling is provided not on the propeller shaft 20 but around one of the axles of the rear wheels 14.

The rear differential 168 includes a case 168c and a differential mechanism 168d. The case 168c extends to the coupling 164 in the axial direction. When the coupling 164 is connected, the case 168c is connected to the power transmission member 172. The differential mechanism 168d is formed of bevel gears. The specific structure and operation of the differential mechanism 168d are known, so the description thereof is omitted.

By changing the operating states of the first clutch 36, the second clutch 162 and the coupling 164, the thus configured four-wheel drive vehicle 160 is able to travel in the 2WD_d mode in which rotation of the propeller shaft 20 is stopped or in the 4WD mode. Thus, the thus configured four-wheel drive vehicle 160 is also able to display the rotation state of each rotating element and the distribution of driving force on the basis of the above-described display control unit 94.

The embodiments of the invention are described in detail above with reference to the accompanying drawings. The invention is also applicable to other embodiments.

For example, the modes of the vehicle model image 96, described in the above embodiments, are only illustrative, and the modes may be combined as needed. For example, the modes may be combined as needed in the following manner. The rotating element in a rotated state is displayed by an arrow, and the rotating element in a non-rotated state is not displayed, displayed by a light color, displayed by a different color, displayed by hollow shape, displayed by dashed line, or the like.

For example, in the vehicle model image 96 described in the above embodiments, the operating state of each engagement element of the disconnect mechanism is displayed by the lit state or unlit state of the corresponding circle segment. It may be replaced with a model image in which a clutch mechanism is engaged or released.

The four-wheel drive vehicles 8, 120, 160 according to the above-described embodiments are only illustrative, and the invention is not limited to these four-wheel drive vehicles 8, 120, 160. That is, the invention is applicable as needed to a four-wheel drive vehicle as long as the four-wheel drive vehicle is able to travel in a state where rotating elements including a propeller shaft are interrupted in the 2WD mode.

In the above-described embodiments, each of the four-wheel drive vehicles 8, 120, 160 has such a structure that power is constantly transmitted to the front wheel side. The invention is not necessarily limited to a vehicle having such a structure that power is constantly transmitted to the front wheel side, but the invention is also applicable to a vehicle having such a structure that power is constantly transmitted to the rear wheel side.

In the above-described embodiments, when an abnormality has been detected in the system, a display informing the abnormality is carried out as shown in, for example, FIG. 12 or FIG. 13. In addition, the abnormality may be informed to the driver by issuing an alarm sound, or the like.

In the above-described embodiments, the first clutch 36 and the second clutch 54 are dog clutches. The clutches are not limited to this type, and appropriate clutches, such as hydraulic friction clutches and electronically controlled couplings, are applicable as long as the clutches are configured to connect or interrupt the power transmission path between rotating elements.

In the above-described embodiments, the right and left driving force distribution control device 124 is provided at the rear wheel side in the four-wheel drive vehicle 120. The right and left driving force distribution control device 124 may be provided at the front wheel side or provided at each of the front wheel side and the rear wheel side.

In the four-wheel drive vehicle 160 according to the above-described embodiment, when one of the second clutch 162 and the coupling 164 is released, the rotating elements including the propeller shaft 20 are interrupted from the rear wheel side. Thus, by using the coupling 164 as the separating device, the second clutch 162 may be omitted.

In the above-described embodiments, the automatic transmission 16 is a stepped automatic transmission formed of a plurality of planetary gear units and friction engagement devices. The automatic transmission 16 is not necessarily limited to this configuration. For example, the automatic transmission 16 may be changed as needed to, for example, a transmission formed of a plurality of meshing gears. The automatic transmission 16 is not necessarily limited to a stepped transmission, and may be a continuously variable automatic transmission.

In the above-described embodiments, the 4WD-ECU 81 and the display-system control ECU are separately provided as the electronic control unit 80. The function of the 4WD-ECU and the function of the display-system control ECU may be processed by a single ECU.

In the above-described embodiments, the arrow indicating the rotation state of each rotating element is displayed on the corresponding rotating element. The invention is not limited to this configuration. The arrow indicating the rotation state of each rotating element may be displayed near the corresponding rotating element.

In the above-described embodiments, "FF mode", "4WD mode", or the like, is used as one example of displaying the rotation state of each rotating element by text. The invention is not limited to this configuration. Other text, such as "During disconnect operation", may be used.

In the above-described embodiments, the rotation speed of each rotating element is expressed by the length or width of the corresponding arrow. The driving force of each wheel may be displayed by an arrow. In this case as well, by increasing the length of the arrow or increasing the width of the arrow as the driving force increases, it is possible to display the driving force.

In the above-described embodiments, the driving force of each wheel is expressed by segments near the corresponding wheel. The display of the driving force is not limited to this configuration, and may be changed as needed by, for example, using an indicator provided in each wheel.

Figure 21:
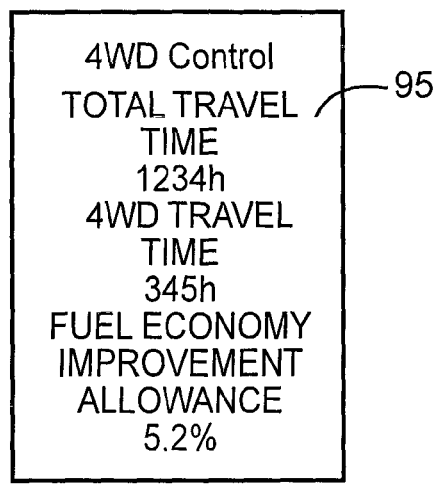
FIG. 21 is another one mode of a display of fuel economy effect on the vehicle model image shown in FIG. 2.

In the above-described embodiments, in FIG. 14A, the total travel distance and the travel distance in the 4WD mode within the total travel distance are displayed. For example, as shown in FIG. 21, a travel distance may be changed to a travel time (operating time), and the travel time (operating time) may be displayed.

In the above-described embodiments, when the first clutch 36 and the second clutch 54, which correspond to the disconnect mechanism, are released, rotation of the predetermined rotating elements stops. The invention is not limited to an embodiment in which rotation of the rotating element stops when transmission of power is interrupted. For example, when there occurs a drag torque between engagement elements even when transmission of power is interrupted, the predetermined rotating element may rotate by the drag torque. That is, even in the disconnect mode, the invention is not limited to the configuration that rotation of the rotating element stops.

The above-described embodiments are only illustrative. The invention may be implemented in a mode including various modifications and improvements on the basis of the knowledge of persons skilled in the art.

What is claimed is:

1. A four-wheel drive vehicle, comprising:
an engine;
an in-vehicle display;
drive wheels to which power is transmitted from the engine while the vehicle travels in a two-wheel drive mode and a four-wheel drive mode;
auxiliary drive wheels to which power is not transmitted from the engine while the vehicle travels in the two-wheel drive mode and to which power is transmitted from the engine while the vehicle travels in the four-wheel drive mode;
a rotating element configured to transmit power from the engine to the auxiliary drive wheels in the four-wheel drive mode;
a disconnect mechanism provided in a power transmission path between the engine and the auxiliary drive wheels, the disconnect mechanism including a first clutch and a second clutch, the first clutch being configured to connect or disconnect a first power transmission path between the engine and the rotating element, the second clutch being configured to connect or disconnect a second power transmission path between the auxiliary drive wheels and the rotating element;
a vehicle model image that is displayed on the in-vehicle display,
the vehicle model image including a first segment, a second segment, and a third segment, the first segment schematically representing axles of the drive wheels, the second segment schematically representing power transmission elements around axles of the auxiliary drive wheels, and the third segment schematically representing the rotating element and schematically connecting the first segment and the second segment; and
an electronic control unit configured to:
control the disconnect mechanism such that the first power transmission path and the second power transmission path are connected during the four-wheel drive mode;
control the disconnect mechanism such that the first power transmission path and the second power transmission path are disconnected during the two-wheel drive mode; and
control the in-vehicle display so as to display an operating state of the disconnect mechanism, the display indicating if the disconnect mechanism is in a disconnect mode or in a non-disconnect mode by using the third segment,
the disconnect mode, corresponding to the two-wheel drive mode, being such that the first power transmission path and the second power transmission path are disconnected, the non-disconnect mode, corresponding to the four-wheel drive mode, being such that the first power transmission path and the second power transmission path are connected.

2. The four-wheel drive vehicle according to claim 1, wherein the electronic control unit is configured to control the in-vehicle display so as to display the operating state of the disconnect mechanism by using text on or near the vehicle model image, in addition to using the third segment.

3. The four-wheel drive vehicle according to claim 1, wherein
the electronic control unit is configured to control the in-vehicle display so as to display the third segment in one of the following display modes in the disconnect mode:
(a) the third segment is not displayed,
(b) the third segment is displayed by a lighter color than the other segments, and
(c) the third segment in the disconnect mode is displayed by a color different from that of the image showing the third segment in the non-disconnect mode.

4. The four-wheel drive vehicle according to claim 1, wherein
the vehicle model image includes a fourth segment schematically representing the first clutch of the disconnect mechanism and a fifth segment schematically representing the second clutch of the disconnect mechanism, and
the electronic control unit is configured to control the in-vehicle display so as to display (i) one of an engaged state and a released state of the first clutch by using the fourth segment, and (ii) one of an engaged state and a released state of the second clutch by using the fifth segment.

5. The four-wheel drive vehicle according to claim 1, wherein
the electronic control unit is configured to control the in-vehicle display so as to display a rotation state of the rotating element by using an arrow on or near the third segment.

6. The four-wheel drive vehicle according to claim 5, wherein
the electronic control unit is configured to control the in-vehicle display so as to change a display of the arrow based on a rotation speed of the rotating element.

7. The four-wheel drive vehicle according to claim 1, wherein
the electronic control unit is configured to control the in-vehicle display so as to change a display of the third segment to a dashed line during the disconnect mode and to change the display of the third segment to a continuous line during the non-disconnect mode.

8. The four-wheel drive vehicle according to claim 1, wherein
the electronic control unit is configured to control the in-vehicle display so as to change a display of the third segment such that:
(1) the third segment is displayed as a lit state of both a frame of the third segment and an area of the third segment during the non-disconnect mode, the area of the third segment being surrounded by the frame, and the third segment is displayed as the lit state of only the frame of the third segment during the disconnect mode, or
(2) the third segment is displayed as the lit state of both the frame of the third segment and the area of the third segment, during the non-disconnect mode, the area of the third segment being surrounded by the frame, and the third segment is displayed as the lit state of only the frame of the third segment in dashed-line form during the disconnect mode.

9. The four-wheel drive vehicle according to claim 1, wherein
the electronic control unit is configured to control the in-vehicle display so as to display a driving force of each wheel near the vehicle model image.

10. The four-wheel drive vehicle according to claim 9, wherein the drive wheels and/or auxiliary drive wheels include at least one of a pair of front wheels and a pair of rear wheels, and the vehicle further comprises:
a right and left driving force distribution control device provided in association with at least one of the pair of front wheels and the pair of rear wheels, wherein
the electronic control unit is configured to control the in-vehicle display so as to display the driving force of each of the right and left wheels.

11. The four-wheel drive vehicle according to claim 1, wherein
the electronic control unit is configured to control the in-vehicle display so as to display an abnormality of a system of the four-wheel drive vehicle when the electronic control unit detects the abnormality.

12. The four-wheel drive vehicle according to claim 11, wherein
the electronic control unit is configured to control the in-vehicle display so as to switch from a screen for displaying the operating state of the disconnect mechanism to a screen for displaying the abnormality of the system of the four-wheel drive vehicle when the electronic control unit detects the abnormality.

13. The four-wheel drive vehicle according to claim 11, wherein the electronic control unit is configured to control the in-vehicle display so as to blink the vehicle model image when the electronic control unit detects the abnormality.

14. The four-wheel drive vehicle according to claim 11, wherein
the electronic control unit is configured to control the in-vehicle display so as to display a fact that the abnormality is detected, on the vehicle model image when the electronic control unit detects the abnormality.

15. The four-wheel drive vehicle according to claim 1,
wherein the electronic control unit is configured to control the in-vehicle display so as to display one of fuel economy effect based on the operating state of the disconnect mechanism and fuel economy effect based on traveling in the two-wheel driving mode.

* * * * *